United States Patent
Hasselgren et al.

(10) Patent No.: US 9,390,541 B2
(45) Date of Patent: Jul. 12, 2016

(54) PROGRAMMABLE TILE SHADER

(71) Applicant: Intel Corporation, Santa Clara, CA (US)

(72) Inventors: Jon N. Hasselgren, Bunkeflostrand (SE); Tomas G. Akenine-Moller, Lund (SE); Carl J. Munkberg, Malmo (SE); Jim K. Nilsson, Lund (SE); Robert M. Toth, Lund (SE); Franz P. Clarberg, Lund (SE)

(73) Assignee: Intel Corporation, Santa Clara, CA (US)

( * ) Notice: Subject to any disclaimer, the term of this patent is extended or adjusted under 35 U.S.C. 154(b) by 317 days.

(21) Appl. No.: 13/858,988

(22) Filed: Apr. 9, 2013

(65) Prior Publication Data
US 2014/0300619 A1    Oct. 9, 2014

(51) Int. Cl.
*G06T 15/00*    (2011.01)
(52) U.S. Cl.
CPC .................................... *G06T 15/005* (2013.01)
(58) Field of Classification Search
None
See application file for complete search history.

(56) References Cited

U.S. PATENT DOCUMENTS

| | | | | |
|---|---|---|---|---|
| 5,973,699 | A * | 10/1999 | Kent ............................. | 345/419 |
| 6,611,272 | B1 * | 8/2003 | Hussain et al. ............... | 345/531 |
| 6,646,639 | B1 * | 11/2003 | Greene et al. ................. | 345/422 |
| 2008/0024497 | A1 * | 1/2008 | Crow et al. ................... | 345/428 |
| 2011/0148876 | A1 * | 6/2011 | Akenine-Moller et al. .. | 345/421 |
| 2011/0169840 | A1 * | 7/2011 | Bakalash ...................... | 345/505 |
| 2014/0176529 | A1 * | 6/2014 | Meixner ................ | G06T 11/40 345/419 |

OTHER PUBLICATIONS

Aila, T., et al., "A Hierarchical Shadow Volume Algorithm", Graphics Hardware, 2004 (9 pages).
Aila, T., et al., "Delay Streams for Graphics Hardware," ACM Transactions on Graphics vol. 22, Issue 3, SIGGRAPH, 2003 (9 pages).
Andersson, J., "DirectX 11 Rendering in BattleField3," 2012 retrieved from the Internet on Jul. 1, 2013 (9 pages).
Cg Toolkit, http://www.opengl.org/sdk/ retrieved from the Internet on Jul. 1, 2013 (3 pages).
Hasselgren, J., et al., "Automatic Pre-Tessellation Culling," ACM Transactions on Graphics, vol. 28, Issue 2, Article 19, Apr. 2009 (10 pages).
Hasselgren, J., et al., "PCU: The Programmable Culling Unit", ACM Transactions on Graphics (Proceedings of ACM SIGGRAPH), vol. 26, Issue 3, Jul. 2007 (10 pages).
OpenGL specification, http://www.opengl.org/sdk/ retrieved from the Internet on Jul. 1, 2013 (1 page).

* cited by examiner

*Primary Examiner* — Daniel Hajnik
(74) *Attorney, Agent, or Firm* — Trop Pruner & Hu, P.C.

(57) ABSTRACT

In accordance with some embodiments, a tile shader executes on a group of pixels prior to a pixel shader. The tile of pixels may be rectangular in some embodiments. The tile may be executed hierarchically, refining each tile into smaller sub-tiles until the pixel or sample level is reached. The tile shader program can be written to discard groups of pixels, thereby quickly removing areas of the bounding triangles that lie outside the shape being rasterized or quickly discarding groups of pixel shader executions that will not contribute to the final image.

28 Claims, 3 Drawing Sheets

PROGRAMMABLE TILE SHADER

BACKGROUND

This relates to graphics processing.

Graphics processing may be performed by the graphics processing unit. Many stages of the graphics processing unit are programmable. However, the rasterizer remains fixed function or non-programmable. The reason for this is that special purpose hardware can be made more efficient in terms of power and performance than a software implementation.

However, some advanced rendering algorithms, such as stochastic rasterization and motion blur, depth of field, direct NURBS rendering, font rendering and curved reflections require custom rasterization algorithms. These algorithms may be implemented on current hardware by rendering an overly conservative shape and using a pixel shader that discards samples not overlapping the shape being rasterized (i.e. triangles that fail the triangle-sample overlap test). In addition, the geometry shader may be used to compute a set of bounding triangles to ensure that the pixel shader is executed for at least all samples overlapping the shape.

For more complex shapes, bounding triangles can typically not be made very tight, resulting in many pixel shader executions for samples that do not overlap the shape and end up being discarded. As the pixel shaders for these algorithms are often very complex, these unnecessary invocations may have severe performance implications.

BRIEF DESCRIPTION OF THE DRAWINGS

Some embodiments are described with respect to the following figures.

DETAILED DESCRIPTION

In accordance with some embodiments, a tile shader executes on a group of pixels prior to a pixel shader. The tile of pixels may be rectangular in some embodiments. The tile may be executed hierarchically, refining each tile into smaller subtiles until the pixel or sample level is reached. The tile shader program can be written to discard groups of pixels, thereby quickly removing areas of the bounding triangles that lie outside the shape being rasterized. These triangles are then said to have failed the triangle-sample overlap test.

Furthermore, the tile shader may be used to reduce, or cull, computations in a pixel shader. Examples include culling light computations in shadowed, or backfacing regions, culling shader computations in areas removed by stencil testing, and culling shadow or visibility computations in fully lit or shadowed regions. It may also be used for adaptive and multi-resolution rendering by moving lower frequency computations for execution on a tile rather than on a per pixel basis. Thus in some embodiments, pixel shader costs may be reduced with complex rendering algorithms.

Figure 1:
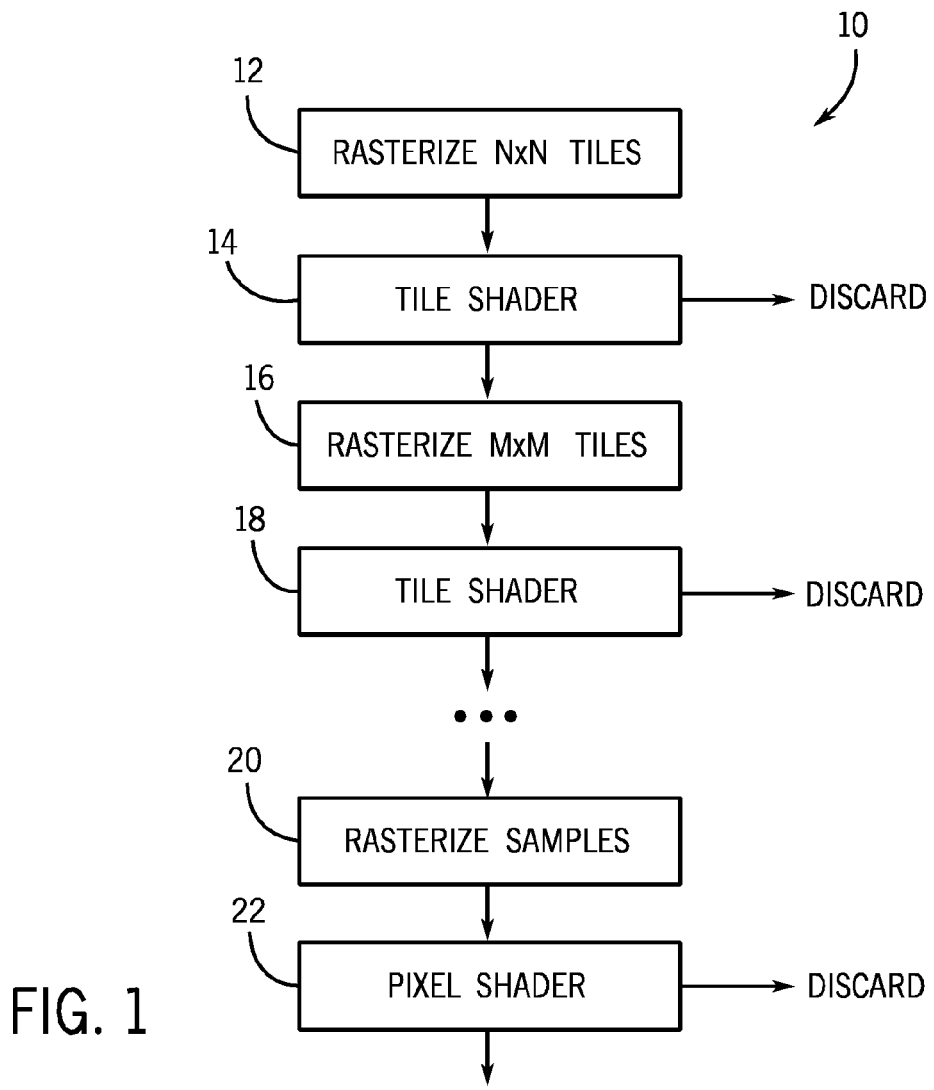
FIG. 1 is a schematic depiction of one embodiment.

Referring to FIG. 1, a hardware pipeline 10 may include a tile shader 14 and a more detailed tile shader 18, operating on a smaller tiles. The tile shaders 14 and 18 may be executed in every hierarchical stage or subset thereof and may discard a tile of pixels or compute output data that may be used further down in the pipeline 10.

The tile shader may be executed for every tile processed by the rasterizer 20. In some embodiments the tile shader may be similar to the pixel shader 22 but the tile shader executes on groups of pixels. Based on an input computed by the preceding rasterizer stage, and the position and extent of the tile, the tile shader can either chose to discard a tile or compute a set of output parameters for that tile based on a programmable selection of a shader function. The output parameters are then fed to the next shader which may be a rasterizer/tile shader pair executed on the smaller sized tile or even a pixel shader as indicated in FIG. 1.

Thus in FIG. 1 after rasterizing tiles of a size N×N (block 12), a tile shader (block 14) may execute on those tiles and provide output data in some cases and in other cases, discard the tile as indicated. Then M×M tiles may be rasterized as indicated at 16. In this case M is less than N, so progressively smaller sized tiles may be processed in a series of successive hierarchical stages, each including rasterization followed by tile shading. In this case, the next tile shader 18 does a similar operation to the prior tile shader 14 but using smaller sized tiles. In some cases still another pair may be used followed by still another pair until a tile is small enough to make it efficient to perform a triangle-sample overlap test for all samples in the tile. Eventually a level involving rasterization of samples (block 20) is reached.

The tile shader may have the same instruction set as the pixel shader in one embodiment. Discarding a tile may be done using a discard or a KIL instruction, indicating that no further processing of a particular tile is needed. The rasterizer may discard the tile and all its subtiles and samples.

The input to the tile shader may be a screen based position and extent of the tile, as well as an input provided by the rasterizer. The input provided by the rasterizer may typically be the tile interpolants or interpolation results evaluated in the corners of the tile, along with a Boolean to handle perspective projection issues. Alternatively, the rasterizer may provide barycentric coordinates of the tile corners, and the shader program can implement attribute interpolation.

Thus, in a first stage, tiles of one size (such as 8×8 pixels) may be utilized and then in the subsequent stage, the tiles may be divided into smaller tiles, such as 4×4 pixels. The process is repeated until a tile is small enough to make it efficient to perform the triangle-sample overlap test for all samples in the tile. A variety of different thresholds may be used for this purpose and a few examples will be given in the subsequent description.

The tiles may be asymmetrical. They can be any size as long as they get progressively smaller as the rasterization is repeated. Furthermore, the division of each level can also be different than that in previous levels. All samples of a surviving tile may then be tested for overlap and the pixel shader is ultimately executed for all the pixels or samples in the tile.

The tile shader may be programmable and may be programmed to perform different functions. It may output multiple values for a tile. It is the responsibility of the next shader program which may be a tile shader on finer granularity or a pixel shader to properly interpret and use the values from the previous stages.

Figure 2:
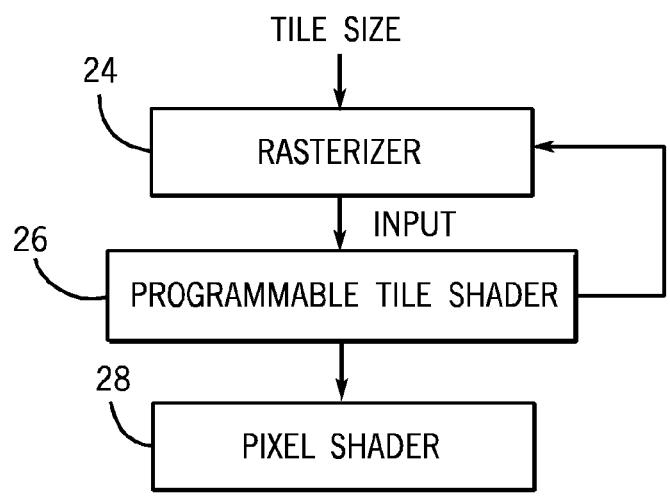
FIG. 2 is a hardware depiction of one embodiment.

Referring to FIG. 2, a depiction of a graphics processor according to one embodiment may include a rasterizer 24 that receives a tile size and provides an input to a programmable tile shader 26. The programmable tile shader may operate as described in connection with FIG. 1. It feeds its output to the pixel shader 28.

One programmable use of the tile shader is to evaluate diffuse shading in all four corners of a tile. If a shading difference between the corners exceeds a predefined threshold, the shading is recomputed or refined in the next shader stage. However if the difference is smaller than that threshold, the shading may be approximated through linear interpolation.

The tile shader can also be programmatically used to implement hierarchical shadow volume rendering. A shadow volume is a technique used in three-dimensional (3D) computer graphics to add shadows to a rendered scene. A shadow volume divides the virtual world into areas that are in shadow and areas that are not. A shadow value may be found by finding all silhouette edges that separate front facing spaces from back facing spaces and then extending all silhouette edges in a direction way from the light source. Then a front cap and/or a back cap may be added to each surface to form a closed volume. The tile shader simply evaluates the shadow function in a single point inside the tile, and when the shadow volume has been processed, that shadow volume is correct for all tiles but for tiles containing a shadow boundary (boundary tiles). For boundary tiles, the more expensive per-pixel shadow evaluation needs to be one.

In general, the tile shader may also be useful for coarser grained analysis of a scene using a delay stream. A delay stream may be added between the vertex and pixel processing units. While a triangle resides in the delay stream, subsequent triangles generate occlusion information. As a result, the triangle may be occlusion culled within each tile by primitives that were submitted after it. Furthermore, memory requirements of order independent transparency can be substantially reduced by using delay streams.

Another programmable use case is deferred lighting. In deferred lighting, information about the fragment that is necessary to perform the shading or lighting is saved by rendering relevant shading data, such as normal vectors and albedo (reflection coefficient) values to textures instead of doing the actual lighting calculation. When the whole geometry is rendered, the lighting is then calculated only once per pixel on the screen so calculations are not wasted. In a deferred lighting programmable tile shader it may be possible to let the tile shader discard a tile if it is indicated that it does not overlap with the influence region of a light source in a forward renderer.

Still another programmable application for a tile shader is in tile based occlusion culling. With geometry bounding techniques, depth bounds for a primitive can be obtained early in the pipeline. If the tile shader can access the hierarchical depth buffer, a primitive can be discarded from further processing in this tile, if it is completely covered by already drawn geometry.

Figure 3:
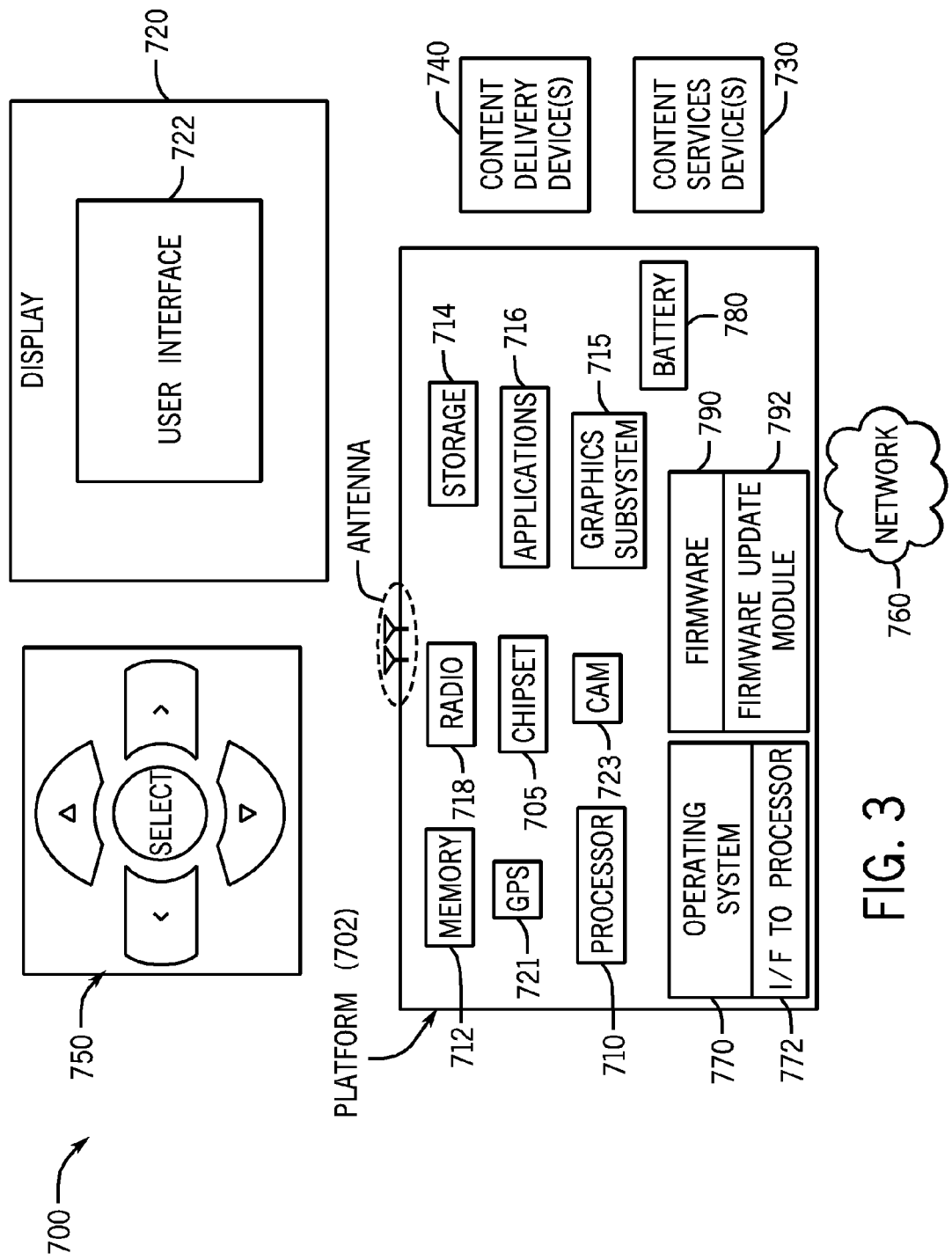
FIG. 3 is a system depiction for one embodiment.

FIG. 3 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 1 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/or display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
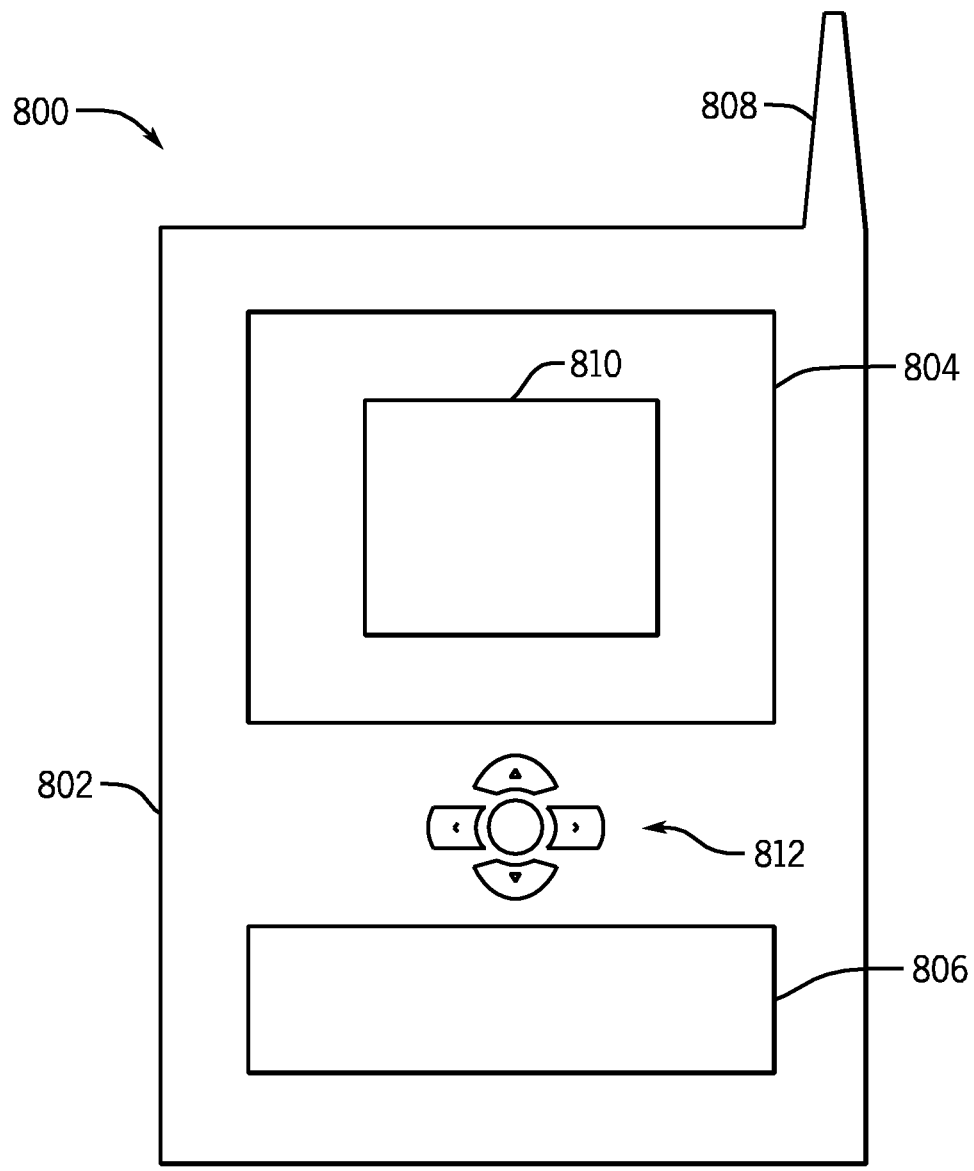
FIG. 4 is a front elevational view of one embodiment.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 2 in software and/or firmware embodiments.

As shown in FIG. 4, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be a method comprising rasterizing a first group of tiles of a given size, in terms of number of pixels per tile, executing tile shading on each tile of said first group of tiles by programmatically computing output data for a tile or discarding the tile, and if a tile is not discarded, sending said output data to a subsequent stage in a graphics pipeline. The method may include repeating said rasterizing and executing on groups of tiles of progressively smaller size and terminating the repeated rasterizing and executing based on the result of executing, and when a smallest hierarchical level is reached, performing pixel shading for all pixels in that tile. The method may also include using a first group of tiles of the same size. The method may also include using a first group of tiles of different sizes. The method may also include using a second group of tiles reduced in size by a first ratio and a third group of tiles reduced in size by a second ratio, including using said second and third groups of tiles wherein the first and second ratios are identical. The method may also include using a second group of tiles, whose tile size is smaller than the first group tile size, and such that an integral number of second size tiles collectively cover the first tile size, and the set of second tiles inside the first tile size should not overlap. The method may also include testing all samples of a tile that is not discarded for overlap with a primitive. The method may also include deciding whether to discard a tile based on inputs computed by a rasterizer, a position of the tile, and an extent of the tile. The method may also include executing tile shading using inputs from a rasterizer including screen space position and extent of the tile as well as an input provided by the rasterizer and including triangle interpolants evaluated at corners of a tile along with a Boolean to handle perspective projection issues or barycentric coordinates of the tile corners. The method may also include executing a tile shader including one of evaluating diffused shading at tile corners, implementing hierarchical volume rendering, performing scene analysis using a delay stream, using deferred lighting or using tile based occlusion culling.

In another example embodiment may be one or more non-transitory computer readable media storing instructions executed by a processor to perform a sequence comprising rasterizing a first group of tiles of a given size, in terms of number of pixels per tile, executing tile shading on each tile of said first group of tiles by programmatically computing output data for a tile or discarding the tile, and if a tile is not discarded, sending said output data to a subsequent stage in a graphics pipeline. The media may further store said sequence including repeating said rasterizing and executing on groups of tiles of progressively smaller size and terminating the repeated rasterizing and executing based on the result of executing, and when a smallest hierarchical level is reached, performing pixel shading for all pixels in that tile. The media may further store said sequence including using a first group of tiles of the same size. The media may further store said sequence including using a first group of tiles of different sizes. The media may further store said sequence including using a second group of tiles reduced in size by a first ratio and a third group of tiles reduced in size by a second ratio, including using said second and third groups of tiles wherein the first and second ratios are identical. The media may further store said sequence including using a second group of tiles, whose tile size is smaller than the first group tile size, and such that an integral number of second size tiles collectively cover the first tile size, and the set of second tiles inside the first tile size should not overlap. The media may further store said sequence including testing all samples of a tile that is not discarded for overlap with a primitive. The media may further store said sequence including deciding whether to discard a tile based on inputs computed by a rasterizer, a position of the tile, and an extent of the tile. The media may further store said sequence including executing tile shading using inputs from a rasterizer including screen space position and extent of the tile as well as an input provided by the rasterizer and including triangle interpolants evaluated at corners of a tile along with a Boolean to handle perspective projection issues or barycentric coordinates of the tile corners. The media may further store said sequence including executing a tile shader including one of evaluating diffused shading at tile corners, implementing hierarchical volume rendering, performing scene analysis using a delay stream, using deferred lighting or using tile based occlusion culling.

Another example embodiment may be an apparatus comprising a processor to rasterize a first group of tiles of a given size, in terms of number of pixels per tile, execute tile shading on each tile of said first group of tiles by programmatically computing output data for a tile or discarding the tile, and if a tile is not discarded, send said output data to a subsequent stage in a graphics pipeline; and a memory coupled to said processor. The apparatus may include said processor to repeat said rasterizing and executing on groups of tiles of progressively smaller size and terminate the repeated rasterizing and executing based on the result of executing, and when a smallest hierarchical level is reached, perform pixel shading for all pixels in that tile. The apparatus may include said processor to use a second group of tiles reduced in size by a first ratio and a third group of tiles reduced in size by a second ratio, including using said second and third groups of tiles wherein the first and second ratios are identical. The apparatus may include said processor to use a second group of tiles, whose tile size is smaller than the first group tile size, and such that an integral number of second size tiles collectively cover the first tile size, and the set of second tiles inside the first tile size should not overlap. The apparatus may include said processor to test all samples of a tile that is not discarded for overlap with a primitive. The apparatus may include said processor to decide whether to discard a tile based on inputs computed by a rasterizer, a position of the tile, and an extent of the tile. The apparatus may include said processor to execute tile shading using inputs from a rasterizer including screen space position and extent of the tile as well as an input provided by the rasterizer and including triangle interpolants evaluated at corners of a tile along with a Boolean to handle perspective projection issues or barycentric coordinates of the tile corners. The apparatus may include an operating system. The apparatus may include a battery. The apparatus may include firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
    rasterizing a first group of tiles of a given size, in terms of number of pixels per tile;
    executing tile shading on each rasterized tile of said first group of tiles by programmatically computing output data for a tile or discarding the tile;
    if a tile is not discarded, sending said output data to a subsequent stage including a pixel shader in a graphics pipeline; and
    repeating said rasterizing and then a corresponding said tile shading by way of at least one tile shader, and executing on groups of tiles of progressively smaller size and terminating the repeated rasterizing and repeated tile shading and executing based on the result of executing, and when a smallest hierarchical level is reached, performing pixel shading for all pixels in that tile.

2. The method of claim 1 including using a first group of tiles of the same size.

3. The method of claim 1 including using a first group of tiles of different sizes.

4. The method of claim 1 including using a second group of tiles reduced in size by a first ratio and a third group of tiles reduced in size by a second ratio, including using said second and third groups of tiles wherein the first and second ratios are identical.

5. The method of claim 1 including using a second group of tiles, whose tile size is smaller than the first group tile size, and such that an integral number of second size tiles collectively cover the first tile size, and the set of second tiles inside the first tile size should not overlap.

6. The method of claim 1 including testing all samples of a tile that is not discarded for overlap with a primitive.

7. The method of claim 1 including deciding whether to discard a tile based on inputs computed by a rasterizer, a position of the tile, and an extent of the tile.

8. The method of claim 1 including executing tile shading using inputs from a rasterizer including screen space position and extent of the tile as well as an input provided by the rasterizer and including triangle interpolants evaluated at corners of a tile along with a Boolean to handle perspective projection issues or barycentric coordinates of the tile corners.

9. The method of claim 1 including executing a tile shader including one of evaluating diffused shading at tile corners, implementing hierarchical volume rendering, performing scene analysis using a delay stream, using deferred lighting or using tile based occlusion culling.

10. One or more non-transitory computer readable media storing instructions executed by a processor to perform a sequence comprising:
    rasterizing a first group of tiles of a given size, in terms of number of pixels per tile;
        executing tile shading on each rasterized tile of said first group of tiles by programmatically computing output data for a tile or discarding the tile; and
    if a tile is not discarded, sending said output data to a subsequent stage including a pixel shader in a graphics pipeline;
    repeating said rasterizing and then a corresponding said tile shading by way of at least one tile shader, and executing on groups of tiles of progressively smaller size and terminating the repeated rasterizing and repeated tile shading and executing based on the result of executing, and when a smallest hierarchical level is reached, performing pixel shading for all pixels in that tile.

11. The media of claim 10, said sequence including using a first group of tiles of the same size.

12. The media of claim 10, said sequence including using a first group of tiles of different sizes.

13. The media of claim 10, said sequence including using a second group of tiles reduced in size by a first ratio and a third group of tiles reduced in size by a second ratio, including using said second and third groups of tiles wherein the first and second ratios are identical.

14. The media of claim 10, said sequence including using a second group of tiles, whose tile size is smaller than the first group tile size, and such that an integral number of second size tiles collectively cover the first tile size, and the set of second tiles inside the first tile size should not overlap.

15. The media of claim 10, said sequence including testing all samples of a tile that is not discarded for overlap with a primitive.

16. The media of claim 10, said sequence including deciding whether to discard a tile based on inputs computed by a rasterizer, a position of the tile, and an extent of the tile.

17. The media of claim 10, said sequence including executing tile shading using inputs from a rasterizer including screen space position and extent of the tile as well as an input provided by the rasterizer and including triangle interpolants evaluated at corners of a tile along with a Boolean to handle perspective projection issues or barycentric coordinates of the tile corners.

18. The media of claim 10, said sequence including executing a tile shader including one of evaluating diffused shading at tile corners, implementing hierarchical volume rendering, performing scene analysis using a delay stream, using deferred lighting or using tile based occlusion culling.

19. An apparatus comprising:
a processor to rasterize a first group of tiles of a given size, in terms of number of pixels per tile, execute tile shading on each rasterized tile of said first group of tiles by programmatically computing output data for a tile or discarding the tile, and if a tile is not discarded, send said output data to a subsequent stage including a pixel shader in a graphics pipeline, and repeat said rasterizing and then a corresponding said tile shading by way of at least one tile shader, and execute on groups of tiles of progressively smaller size and terminate the repeated rasterizing and repeated tile shading and execute based on the result of executing, and when a smallest hierarchical level is reached, perform pixel shading for all pixels in that tile; and
a memory coupled to said processor.

20. The apparatus of claim 19, said processor to repeat said rasterizing and executing on groups of tiles of progressively smaller size and terminate the repeated rasterizing and executing based on the result of executing, and when a smallest hierarchical level is reached, perform pixel shading for all pixels in that tile.

21. The apparatus of claim 19, said processor to use a second group of tiles reduced in size by a first ratio and a third group of tiles reduced in size by a second ratio, including using said second and third groups of tiles wherein the first and second ratios are identical.

22. The apparatus of claim 19, said processor to use a second group of tiles, whose tile size is smaller than the first group tile size, and such that an integral number of second size tiles collectively cover the first tile size, and the set of second tiles inside the first tile size should not overlap.

23. The apparatus of claim 19, said processor to test all samples of a tile that is not discarded for overlap with a primitive.

24. The apparatus of claim 19, said processor to decide whether to discard a tile based on inputs computed by a rasterizer, a position of the tile, and an extent of the tile.

25. The apparatus of claim 19, said processor to execute tile shading using inputs from a rasterizer including screen space position and extent of the tile as well as an input provided by the rasterizer and including triangle interpolants evaluated at corners of a tile along with a Boolean to handle perspective projection issues or barycentric coordinates of the tile corners.

26. The apparatus of claim 19 including an operating system.

27. The apparatus of claim 19 including a battery.

28. The apparatus of claim 19 including firmware and a module to update said firmware.

* * * * *